April 23, 1957  W. L. MELTON  2,789,757
OIL TESTING CENTRIFUGE
Filed Jan. 18, 1956  3 Sheets-Sheet 1
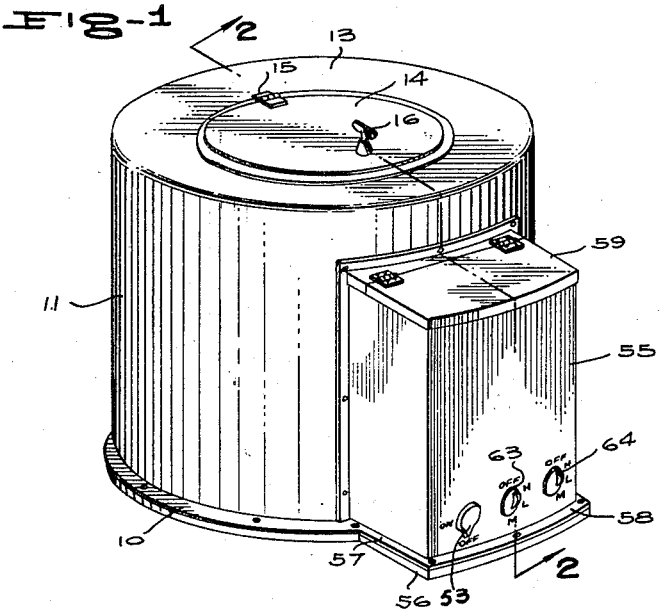
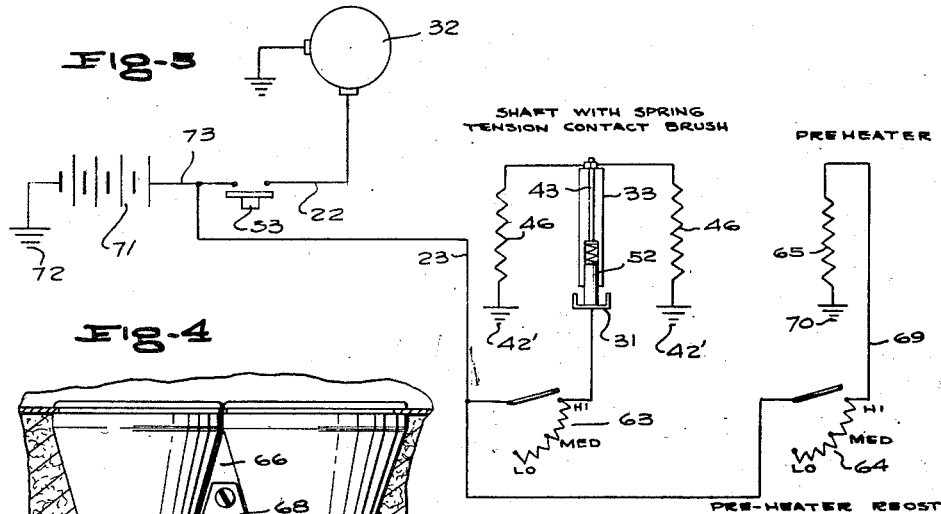
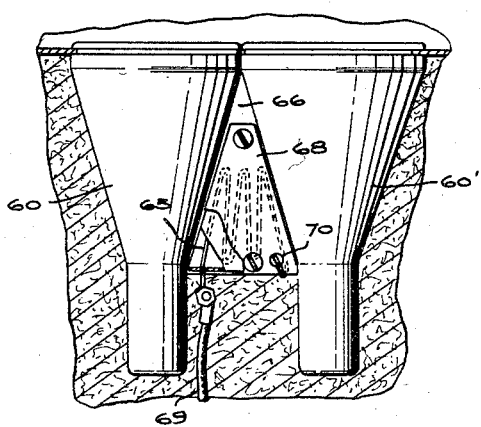
INVENTOR.
WILLIAM L. MELTON
BY
Christian D. Nielsen
ATTORNEY April 23, 1957  W. L. MELTON  2,789,757
OIL TESTING CENTRIFUGE
Filed Jan. 18, 1956  3 Sheets-Sheet 2

INVENTOR.
WILLIAM L. MELTON
BY
Christian D Nielsen
ATTORNEY

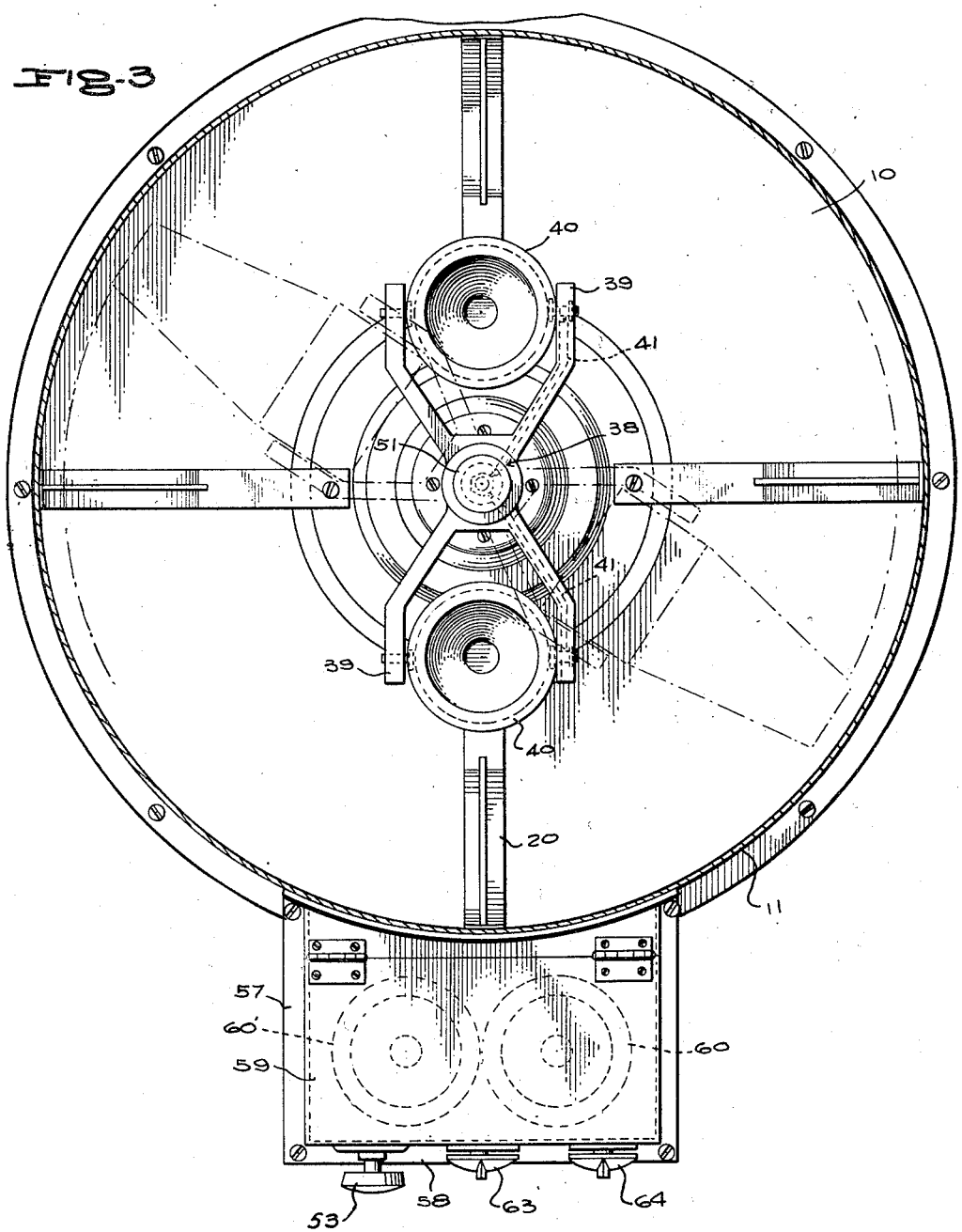

United States Patent Office 2,789,757
Patented Apr. 23, 1957

2,789,757

OIL TESTING CENTRIFUGE

William L. Melton, Selman City, Tex.

Application January 18, 1956, Serial No. 559,842

2 Claims. (Cl. 233—26)

This invention relates to a centrifugal machine for testing oil that must be heated to a predetermined temperature, and more particularly to a machine for testing crude oil in the oil fields, the machine being powered by an automobile storage battery, and it consists in the constructions, arrangements and combinations herein described and claimed.

An object of the invention is the provision of a machine which will subject oil in test tubes to a centrifugal action and to a predetermined temperature, said test tubes containing the oil being sealed in heating chambers depending from arms radiating from a motor driven shaft with a controlled heating means disposed in the chamber.

Another object of the invention is the provision of a machine in which oil in test tubes may be subjected to a centrifugal and heating action and the preheating of oil in other test tubes simultaneously.

A further object of the invention is the provision of a machine adapted to test oil that requires centrifugal motion and a predetermined temperature for the purpose, the oil being retained at a raised temperature at the conclusion of the test, provision being made to preheat the liquids in the test tubes prior to the application of the centrifugal motion.

This invention is best understood from a consideration of the following detailed description and the accompanying drawings forming part of the specification, nevertheless, it must be borne in mind that the invention is not confined to the disclosure, but is susceptible of such changes and modifications as shall define no material departure from the salient features of the invention as expressed in the appended claims.

In the drawings:

Figure 1 is a perspective view of the machine for testing oil.

Figure 3 is an enlarged horizontal section taken on the line 3—3 of Figure 2.

Figure 4 is an elevational view of the preheating chamber detached from the machine with parts broken away.

Figure 5 shows more or less diagrammatically, the electric circuits of the machine.

Figure 2:
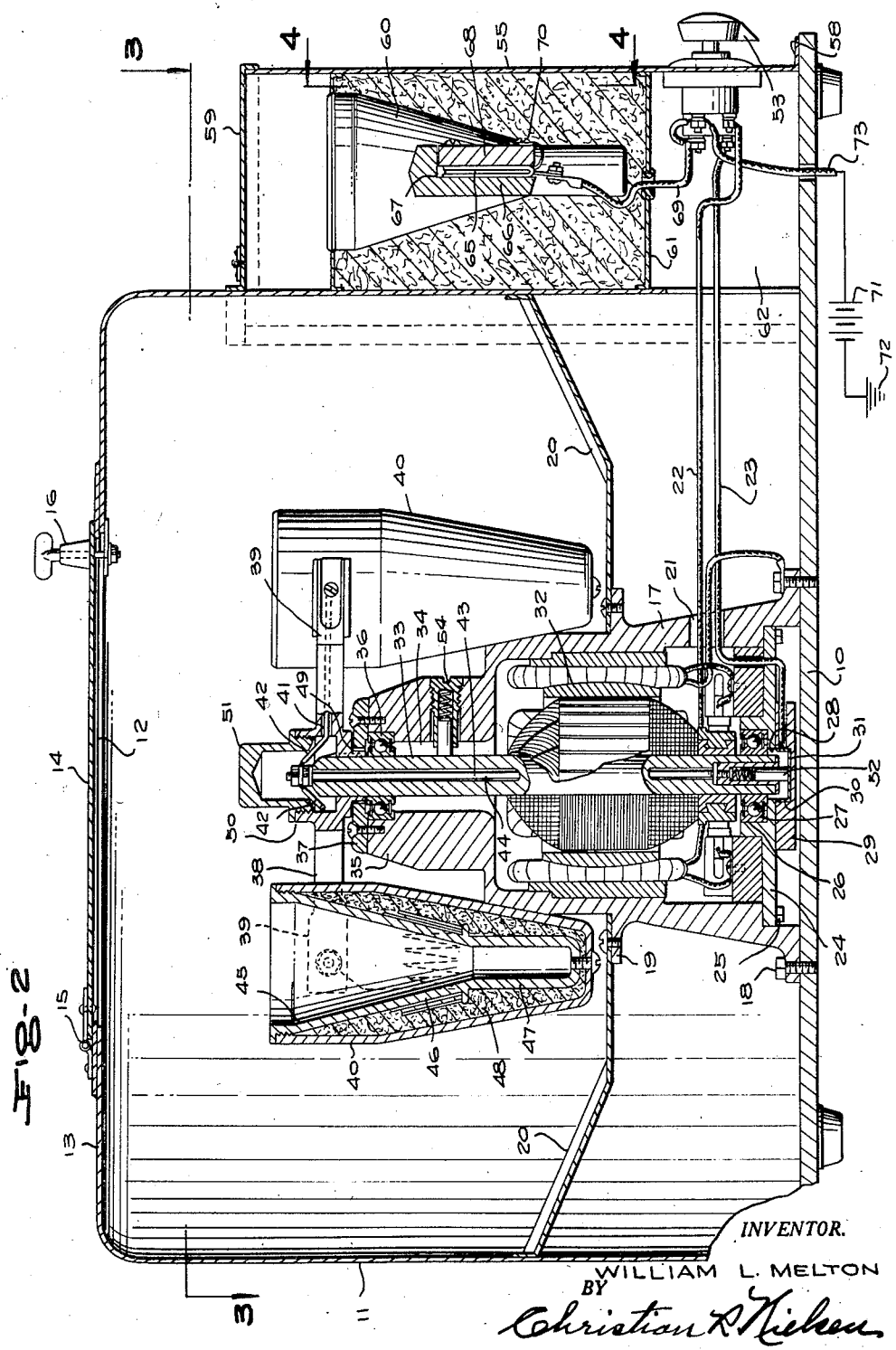
Figure 2 is an enlarged vertical section taken on the line 2—2 of Figure 1.

Referring more particularly to the drawings, 10 designates a base to which is bolted a cylindrical housing 11 having an opening 12 at the top 13. A cover 14 closes the opening and is hinged at 15. A latch 16 secures the cover in place. A table or support 17 is bolted at 18 to the base 10. The upper end of the table is reduced to provide an annular shoulder 19 to which is attached the lower ends of braces 20. The upper ends of the braces are secured in any approved manner to the inner side walls of the housing. The table is frusto-conically shaped having an opening 21 therein for the passage of electric wires 22 and 23.

A plate 24 is bolted at 25 within a low portion of the table 17, the plate having an axially located seat 26 for support of an oil sealed bearing 27. The plate 24 is also formed with a medial opening 28 for a purpose as will presently appear. A Bakelite or other insulator 29 is suitably secured beneath the plate 24 and centered beneath the opening 28. The insulator is formed with a recess 30 for seating a contact plate 31 which is electrically connected to the wire 23.

An electric motor 32 is suitably mounted within the hollow support 17, the shaft 33 of the motor projecting upwardly through a bore 34 of a vapor and moisture proof housing 35, the upper end of said bore mounting an oil sealed bearing 36. A collar 37 closes the bore 34 as well as retaining the bearing 36 in position. The motor shaft 33 is rotatably supported by the bearings 27 and 36 and is of a length to project beyond the collar 37 for fixed mounting of a cross head 38 so as to rotate with the shaft. The cross head 38 extends outwardly to opposite sides of the support 17 and respective ends are formed with a fork 39 (see Figure 3) for pivotally supporting a casting 40. One of the fork arms of each fork 39 is provided with an opening 41 for reception of respective wires 42 which are electrically connected to the upper end of a conductor 43 housed in a longitudinal bore 44 formed in the motor shaft 33.

Within each casting 40, a cell 45 is secured and about which a heating element 46 is electrically connected, receiving current through respective wires 42 and ground 42'. The cell 45 is constructed so as to support a test tube and is therefore formed with a reduced diameter 47 forming a seat for the test tube and further, the space between the casting 40 and the cell 45 is filled with rock wool 48.

The cross head 38 is provided with a collar 49 upon the underside thereof for seating engagement upon the inner race of the bearing 36, while on the upper side of the arm a threaded boss 50 is formed receiving a closure cap 51 thus protecting the wires 42 and contact 43 from entrance of foreign matter.

In order that electrical energy can be established with the conductor 43 within the shaft of the motor, a spring pressed brush 52 is mounted in the lower end of the shaft 33 and in engagement with the plate 31 which receives current through the wire 23 when the motor switch 53 is closed.

Passage of electrical current to the bearings of the motor is prevented in the provision of a ground brush 54 which is mounted in the housing 35, the brush being in contacting engagement with the shaft 33.

A preheating casing 55 is attached to one side of the housing 11 and extension 56 of the base 10 by means of flanges 57 and 58. A hinged cover 59 closes the top of the casing. The preheating chambers are confined between the cover and a sealed bottom 61, located above the base to provide a chamber 62 for housing the switch 53 which controls the operation of the motor 32; a rheostat 63 which controls the heating element 46, and a rheostat 64 which controls the heating element 65 of the preheater chambers.

As clearly shown in Figure 4, a pair of preheating chambers 60—60' are enclosed within the casing 55 and are preferably cast as a unit connected by a wall 66 which is of a thickness to form a recess 67 for housing the heating element 65 which is held in position by means of a cover plate 68. One side of the heating unit is connected to the rheostat 64 by a wire 69, while the other side is grounded to the cover plate as at 70. It will thus be seen that the preheating chambers 60—60' are heated simultaneously by a single heating element and that heat at proper temperature will be transmitted to oil in test tubes supported within the preheating chambers.

An automobile battery 71 is employed, one side of which is grounded as at 72, while the other side is connected to the switch 53 by wire 73.

The operation of the machine is as follows: The test tubes with oil therein are placed in the preheater 60—60' while other tubes containing oil to be tested are inserted into the cells 45 and the opened covers 14 and 59 are then closed. The rheostats 63 and 64 are adjusted to obtain the proper temperature of the contents in the test tubes in the cells 45 and heating chambers 60—60' and where the centrifugal force is necessary in the testing operation, the switch 53 is moved to energize the motor 32 which will revolve the shaft 33 and the crosshead 38 carrying the cells 45 and oil in the test tubes in the cells will be activated by the centrifugal force.

From the foregoing, it will be seen that the machine is capable of use in testing oil in the field requiring centrifugal motion and that requires the oil in test tubes being tested to be heated to a desired temperature, and to still be hot at the conclusion of the test. The machine can also be used to test oil that requires a temperature rise while in motion. In other words, a cold test tube can be placed in a cell which will be heated while the machine is in motion.

I claim:

1. A machine for treating oil in test tubes by centrifugal force at a predetermined temperature comprising a housing having a base, a table in the housing attached to the base, a motor supported by the table, a motor shaft extending vertically upward, an elongated crosshead fixed to the upper end of the shaft, a heating chamber supported swingably from each outer end of the cross head, an electric heating element in each chamber, wires forming an electric circuit supplying current to the heating elements, means controlling the temperature of the heating elements and incorporated in the circuit, said chambers having means for supporting test tubes filled with oil, and means operating the motor for applying centrifugal force to the oil in the test tubes while said oil is being heated.

2. A machine for treating oil in test tubes by centrifugal force at a predetermined temperature comprising a vertically disposed shaft, means for rotating the shaft, a support, bearings on the support for the shaft, an elongated cross head fixed to the upper end of the shaft, a heating chamber depending from each pair of the projecting ends of the cross head, means swingably mounting the heating chambers from the pairs of ends of the cross head, a motor carried by the support, an electric heating element in each chamber, said shaft being hollow, an elongated electrical contact within said hollow shaft and projecting therefrom and rotatable therewith, a pair of wires connected to said contact, respective wires connected to the heating element in each chamber, means at the base of said elongated contact supplying current to the heating elements and means causing operation of the motor.

References Cited in the file of this patent
UNITED STATES PATENTS

| | | |
|---|---|---|
| 574,439 | Mays | Jan. 5, 1897 |
| 1,991,925 | Garver | Feb. 19, 1935 |
| 2,628,773 | Boileau | Feb. 17, 1953 |